United States Patent Office 3,234,129
Patented Feb. 8, 1966

3,234,129
LUBRICATING COMPOSITIONS
Warren L. Perilstein, Orchard Lake, Mich., assignor to Ethyl Corporation, New York, N.Y., a corporation of Virginia
No Drawing. Filed Aug. 1, 1962, Ser. No. 213,900
4 Claims. (Cl. 252—32.7)

The present invention relates to lubricating compositions containing as essential ingredients a tungsten compound and a sulfur-containing compound.

It is well known to deposit solid lubricating films on metal wear surfaces by a chemical process. These involve a reaction of the wear surface with its environment and thus there is a sacrificial loss of metal. In contradistinction to such a process, the present invention is concerned with the in situ formation of a tungsten film which, with the possible exception of catalytic action, does not involve a reaction with the metallic surface. More particularly, the present invention provides lubricating compositions containing two chemical species which due to temperatures and pressures generated by rubbing surfaces react intermolecularly to form a new species which provides the lubricating film.

It is known that solid oil-insoluble materials such as, for example, tungsten disulfide may be deposited on a metallic surface to form a laminar structure to enhance anti-friction and lubricant properties. Generally such coatings are obtained by forming a colloidal suspension of the tungsten compound in the oil (or grease). During running, the suspension is deposited on the metallic surface and fills the irregularities therein, thus reducing friction and improving wear and lubricating properties. However, such solutions suffer a disadvantage which is inherent with every colloidal suspension in that they are susceptible to flocculation which causes a loss of effectiveness.

It is the object of the present invention to provide lubricating compositions containing solutions of a tungsten compound and a sulfur-containing material. Another object is to provide lubricating compositions wherein under the influence of temperatures and pressures generated by rubbing surfaces, two chemical species react to form a third species. Another object is to provide lubricating compositions having superior antiwear and anti-friction properties. Still another object of the invention is to provide a method for the deposition of a tungsten-sulfur compound on metallic surfaces.

The objectives of this invention are accomplished by providing lubricant compositions prepared by dissolving in a lubricant, a soluble compound of tungsten and a soluble compound of sulfur. Under the influence of operating temperatures and pressure, i.e., during running, the two constituents react to form a tungsten-sulfur product. This latter material is then deposited on the metallic surfaces to be lubricated. The nature of the reaction product is complex and undefined; however, the electron defraction patterns obtained on the product show that $WS_2$, $WO_2$, $WO_3$, and $W_4O_{11}$ are not present.

As stated above there are two essential constituents in the lubricating composition of this invention—a tungsten compound and a sulfur-containing compound. In order to be useful as additives of this invention, the compounds must be soluble in the lubricating medium, and must be capable of reacting to form a tungsten-sulfur product.

One class of useable tungsten compounds are the arene tungsten tricarbonyls having the formula $$RW(CO)_3$$

wherein R represents an aromatic compound having a benzene nucleus coordinated to the tungsten atom through the carbon atoms of the benzene ring. The carbonyl groups are electron donors and are involved in covalent and coordinate-covalent bonding with the tungsten atom. These compounds achieve stabilization through coordination of sufficient electrons to give tungsten the configuration similar to that of the next higher rare gas. With these compounds the aromatic portion is actually a molecule as distinguished from an aryl radical such as phenyl, which is found in organometallic compounds. Each carbon of the aromatic ring is bonded, apparently by coordinate valences in a fashion such that the ring contributes 6 electrons to the metal atom. Likewise the carbonyl groups are also covalently or coordinatively bonded to the metal atom.

In the above formula R is an aromatic compound containing from 6 to about 15 carbon atoms. Examples of useable aromatic groups are benzene itself, mesitylene, toluene, biphenyl, tetralin, and the like. A preferred compound from this group is benzene tungsten tricarbonyl.

Another group of tungsten compounds useable in the present compositions are the bis-arene compounds of tungsten having the formula $$R_2W$$

wherein R is an aromatic compound having up to about 15 carbon atoms. These compounds are aromatic complexes containing two 6-membered rings. Typical examples are dibenzene tungsten, dimesitylene tungsten, ditoluene tungsten, etc.

The arene tungsten tricarbonyls and the diarene tungsten compounds are known and methods for their preparation are described in "Organometallic Chemistry" by H. Zeiss, Reinhold Publishing Corporation, New York, N.Y. (1960).

The preferred tungsten compounds used in the present compositions are those having the formula $$WX_{6-n}(OR)_n$$

where R is an aryl radical having from 6 to about 18 carbon atoms and is preferably a phenyl or naphthyl radical and these radicals substituted with other hydrocarbon substituents such as alkyl and cycloalkyl radicals; X is chlorine or bromine and $n$ is an integer from 1 to 6.

Typical examples of these tungsten compounds include tetrachlorodiphenoxy tungsten, dichlorotetraphenoxy tungsten, hexaphenoxy tungsten, hexa(m-tolyloxy)tungsten, hexa(3,5-diethylphenoxy)tungsten, chloropenta(1-naphthyloxy)tungsten, dichlorotetra(1-naphthyloxy)tungsten, tetrachloro-di(2-naphthyloxy)tungsten, tetrachlorobis(4 - methyl - 1 - naphthoxy)tungsten, and hexa(1-naphthyloxy)tungsten.

The preferred compounds are those wherein all the halogen atoms are completely replaced by phenoxy or naphthyloxy groups, such as hexaphenoxy tungsten, hexa (1 - naphthyloxy)tungsten, hexa(2,4 - dipropylphenoxy) tungsten, and hexa(3,5-diethyl-1-naphthyloxy)tungsten.

One method for the preparation of this series of compounds involves reaction of tungsten hexachloride with the corresponding phenol or naphthol in the presence of a solvent such as carbon tetrachloride. The method is described by Funk and Bauman, Z. Anorg. u. Allgem. Chem. 231, 264–266 (1937).

The second essential ingredient of the lubricant compositions of this invention is a soluble sulfur-containing compound. Various classes of such compounds are the mercaptans having the formula RSH; the sulfides, $RSR_1$; and the disulfides, RSSR; wherein R and $R_1$ are the same or different and are hydrocarbon radicals containing from 1 to about 30 carbon atoms and are selected from the group consisting of alkyl, cycloalkyl, aryl, aralkyl, and alkaryl radicals. Alkyl and aryl radicals having up to about 12 carbon atoms are preferred.

The sulfur-containing compound can also be a metal salt or an amine salt of substituted dithiocarbamic acids, or phosphorodithioic acids of the following formulae:

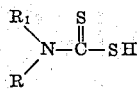

and

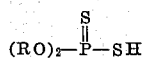

wherein R and $R_1$ may be the same or different and are hydrocarbon radicals of from 1 to about 30 carbon atoms selected from the group consisting of alkyl, cycloalkyl, aryl, alkaryl, and aralkyl radicals. R and $R_1$ are preferably alkyl radicals having from 2 to about 12 carbon atoms.

Any metal salt of the above enumerated acids which is soluble in the lubricating medium may be used. However, it is preferred to employ metals from Groups I–A, II–A, II–B, IV–A, V–A and VIII of the Periodic Table, especially cadmium, calcium, barium, nickel, sodium, lead, bismuth and zinc.

The amines which may be employed to form salts with the above acids include primary, secondary, and tertiary amines substituted with hydrocarbon radicals of from 1 to about 20 carbon atoms and are preferably alkyl or cycloalkyl amines having from 2 to about 12 carbon atoms in each hydrocarbon group.

An outstanding embodiment of the useable sulfur compounds are the metal dialkyl phosphorodithioates having the formula

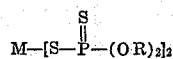

wherein M is a divalent metal selected from the group consisting of cadmium, barium, calcium, nickel and zinc, and R is an alkyl radical containing from 1 to about 20 carbon atoms preferably 2 to 12 carbon atoms. Zinc is an especially preferred embodiment. These compounds, when used in combination with the above defined tungsten compounds provide lubricating compositions with outstanding wear and anti-friction properties.

The ratio of the two essential ingredients of the lubricating compositions is not critical. However, it is preferred to use from about 0.2 to 10 parts of the metal complex per part of the sulfur-containing compound. In many applications a ratio of from about 0.5:1 to 2:1 is optimum.

The additives of this invention may each be used in a concentration of from about 0.005 to 5 weight percent. Due to the highly effective nature of the present additives, and because of economic considerations, concentration of from about 0.05 to about 1.0 percent of each of the essential ingredients is preferred. In many applications, concentrations as low as 0.1 to 0.2 percent are optimum to impart the desired properties to the lubricating compositions.

In formulating the lubricating compositions within the scope of this invention, the base material may be any lubricant known to the art. Thus, it may be a hydrocarbon base material derived from sources such as animal, vegetable and mineral oil stocks. One preferred lubricant base is a mineral oil derived from crude oil stock and containing varying proportions of paraffinic, naphthenic and aromatic hydrocarbons. Especially preferred are mineral oils which are predominantly paraffinic.

Various synthetic base lubricants can also be used as the base materials for the present compositions. These include polyester oils formed by the reaction of a polycarboxylic acid with a monohydric alcohol, the reaction of a polyhydric alcohol with monocarboxylic acid, or between a polyhydric alcohol and a polycarboxylic acid, or combinations of the above reactants. One preferred embodiment of such synthetic oils are diester oils obtained by reaction of a dicarboxylic acid with a branched chain alcohol such as for example between succinic acid with amyl alcohol.

Other synthetic oils that are useful as the base lubricant include silicones, siloxanes, silanes, alkoxy silanes, aryloxy silanes, etc. Other synthetic materials such as fluorocarbons may also be used.

For the purpose of this invention, the above described lubricant bases may also be in the form of a grease. Greases are complex semi-solid or solid combinations of a base lubricant and a soap or a mixture of soaps with or without fillers. For example, the primary components of mineral based greases are soap and mineral oils. Such soaps may be derived from mineral or vegetable fats or fatty acids, wool grease, rosin or petroleum acids. The grease may also be derived from the synthetic lubricants discussed above with a soap and with or without additional fillers.

Some outstanding compositions of the present invention are shown by the following examples.

EXAMPLE I

To a Mid-Continent, solvent refined, mineral oil having a viscosity index of 101 and a viscosity of 300 Saybolt Universal seconds (SUS) at 100° F. and 52 SUS at 210° F. was added 0.5 percent of dibutyl disulfide and 0.1 percent dichlorotetranaphthyloxy tungsten. When this composition is utilized in a lubricating application, due to heat and pressure resulting from friction, the tungsten compound and the dibutyl sulfide react to form a tungsten-sulfur product which is deposited on wear surfaces thereby improving lubricating and anti-friction properties.

EXAMPLE II

A solvent extracted Pennsylvania bright stock having a viscosity index of 105 and a viscosity of 660 SUS at 100° F. and 75 SUS at 210° F. is used as the base material for this example. To this mineral oil is added 0.1 percent of hexyl mercaptan, and 0.05 percent dibenzene tungsten.

EXAMPLE III

The lubricant base for this example is diisooctyl adipate having a viscosity of 35 SUS at 210° F., a viscosity of 57 SUS at 100° F., a viscosity of 3980 SUS at −40° F. and a viscosity of 22,250 at −65° F. Its viscosity index is 143 and its specific gravity (60° F./60° F.) is 0.926. To this diester is added 3.0 percent of the salt of dibutyl amine and dioctyl phosphorodithioic acid. Also added to the oil is 1.0 weight percent of benzene tungsten tricarbonyl.

EXAMPLE IV

To Dow-Corning 200 silicone fluid is added 2.0 percent of the salt of hexyl amine and diethyl dithiocarbamic acid. Also added to the base fluid is 0.2 percent of dibromotetraphenoxy tungsten. Dow-Corning 200 silicone fluid is a dimethyl polysiloxane having a viscosity of 100 centistokes at 25° C., an open cup flash point of 575° C., a pour point of −67° F., and a specific gravity of 0.970 at 77° F.

EXAMPLE V

The base lubricant of this example is a grease consisting of 15 percent of soda soap prepared from equal amounts of stearic acid and of rosin, 10 percent candelilla wax and 75 percent of mineral lubricating oil of a viscosity of 100 SUS at 210° F. and a viscosity index of 72. To this grease are added 4 percent of the cadmium salt of dihexyl dithiocarbonic acid. Also added to the grease is 5.0 percent of dichlorotetra(2-naphthyloxy) tungsten.

EXAMPLE VI

To a paraffinic mineral oil having a viscosity of 17.15 centistokes at 100° F. and 3.64 centistokes at 210° F. and a viscosity index of 107.5 was added 0.5 parts of hexa(2-naphthyloxy) tungsten. Also added to this lubricant was 0.1 percent phosphorus as a mixture of zinc diethyl, dibutyl and dihexyl phosphorodithioate. The finished lubricant, when put into operation, under the influence of heat and pressure generated by rubbing surfaces, undergoes a chemical reaction to form a tungsten-sulfur product. This material deposits on the metallic surfaces imparting improved lubricant properties thereto.

A series of tests was carried out using the Four Ball Wear Testing Machine to measure the wear properties of various lubricating compositions. The machine is described by Larsen and Perry in the "Transactions of the A.S.M.E.," January 1945, pages 45–50. It operates in the range of 0.1 to 50 kilograms.

The machine utilizes four balls of equal size arranged in a tetrahedral formation. The bottom three balls are held in a non-rotatable fixture which is essentially a universal chuck that holds the balls in abutting relation to each other. Since the bottom three balls are of equal size, their centers form the apices of an equilateral triangle. The top ball is affixed to a rotatable spindle whose axis is positioned perpendicularly to the plane of the ball holder and in line with the center point of the triangle, whose apices are the centers of the three bottom stationary balls.

In operation, the four balls are immersed in the lubricant composition to be tested, and the fixture holding the three bottom balls is moved upwardly so as to bring the three fixed lower balls into engagement with the upper rotating ball. As the load is increased, the fixture is moved upwardly and axial of the rotating spindle affixed to the upper ball.

The lubricity of the lubricant under test and, therefore, the anti-wear activity of the additive it contains, is determined by the amount of wear occurring on the lower balls at the points of contact with the upper rotating ball. If the lubricant is completely effective, the amount of wear will be negligible. On the other hand, if the lubricant is not completely effective under the test conditions, the wear which occurs on the lower three balls will be excessive. The average diameter of the circular scar areas of the lower balls is measured so as to give a quantitative basis for comparing the test results with those of other tests. The smaller the scar diameter, the more effective is the additive as an anti-wear agent.

Various lubricating compositions were subjected to the Four Ball Wear test to determine the lubricating effectiveness of the compositions of this invention as compared to a non-additive-containing base lubricating medium. The test conditions were the same in each of the tests with the four balls being ½" in diameter and constructed of SAW 52100 steel. The speed of rotation of the upper ball was 1800 r.p.m. and the lubricant was maintained constant at 125° C. Tests were carried out at a loading of 50 kilograms.

In order to establish a base line for comparison, a non-additive-containing paraffinic white mineral oil having a viscosity of 17.15 centistokes at 100° F. and 3.64 centistokes at 210° F., and a viscosity index of 107.5 was tested. Also tested were samples of the mineral oil-containing tungsten compound or a sulfur-containing material. Compositions of this invention wherein the mineral oil contained both a tungsten compound and a sulfur-containing material were also tested. Wear, in terms of scar diameter, was measured periodically. Typical results of these tests are set forth in the following table in which the values for scar diameters are average values obtained from a number of runs.

Table I

WEAR PROPERTIES OF VARIOUS LUBRICATING COMPOSITIONS

| Time, min. | Scar diameter, mm. | | | |
|---|---|---|---|---|
| | Base lube | +0.1% P as Zn dithio* | +0.5% W as $W(OC_{10}H_7)_6$ | Zn dithio* +$W(OC_{10}H_7)_6$ |
| 0.5 | 1.92 | 0.42 | 1.96 | 0.37 |
| 5.0 | 1.85 | 0.80 | 1.81 | 0.56 |
| 30.0 | 1.93 | 0.99 | 1.96 | 0.38 |
| 120.0 | 1.69 | 1.18 | 2.12 | 0.38 |
| 300.0 | 1.97 | 1.00 | 1.94 | 0.40 |

*Mixture of zinc dipropyl, dibutyl and dihexyl phosphorodithioate.

The above data clearly demonstrate the unexpectedly superior properties of the compositions of this invention. As shown, the hexanaphthyloxy tungsten was ineffective in improving the lubricating properties of the base oil. The zinc dialkyl phosphorodithioate improved the lubricating properties to a degree, but became less effective during the latter part of the test. For example, after 300 minutes of running, scar diameters of 1.97 mm. obtained with the base lubricant were not reduced by adding the tungsten compound, and only reduced to 1.0 mm. by addition of the zinc compound.

Unexpectedly, the lubricant containing both the tungsten compound and the sulfur compound showed a remarkable improvement in wear properties as evidenced by a scar diameter of only 0.40 mm. after 300 minutes of running. Thus, there is clearly an interaction between the two compounds to form a third species with lubricating properties, greater than would be expected from a knowledge of the effectiveness of each component. Similar results are obtained with other compositions of this invention.

The lubricants of this invention can also contain other additives used to impart desirable characteristics to the base. By way of example, the lubricants can contain detergent-dispersants such as barium and calcium sulfonates, or naphthenates, polymethacrylates, reaction products of dibasic acids with amines such as alkenyl succinimides, rust inhibitors such as dibasic acids and their anhydrides and imides and amides of these acids, antioxidants such as phenylene diamine, and hindered phenols such as 2,6-di-tert-butyl-4-methyl phenol, 4,4'-methylene bis(2,6-di-tert-butyl phenol), etc. The present composition may also contain viscosity index improvers such as polymerized olefins or isoolefins, butylene polymers, methacrylic acid ester polymers, alkylated styrene polymers, color stabilizers such as hydroquinones, dithiocarbamates, aliphatic amines, dicyclohexyl amines, etc.

I claim.

1. A lubricant composition comprising a major proportion of a lubricant base selected from the class consisting of hydrocarbon base lubricating oils and greases and synthetic base lubricating oils and greases containing:
 (A) from 0.005 to about 5 per cent of a tungsten compound selected from the group consisting of
  (1) diarene tungsten compounds wherein each arene moiety is an arene hydrocarbon moiety of 6 to about 15 carbon atoms
  (2) arene tungsten tricarbonyl compounds wherein said arene moiety is an arene hydrocarbon moiety of 6 to about 15 carbon atoms (3) compounds having the formula $$WX_{6-n}(OR)_n$$

where R is an aryl radical selected from the group consisting of phenyl and naphthyl radicals; X is selected from the group consisting of chlorine and bromine, and $n$ is an integer from 1 to 6, and (B) from 0.005 to about 5 per cent of a sulfur-containing compound selected from the group consisting of (1) mercaptans of the formula RSH
(2) sulfides of the formula $RSR_1$
(3) disulfides of the formula $RSSR_1$
(4) oil-soluble metal and amine salts of acids having the formulae (a) 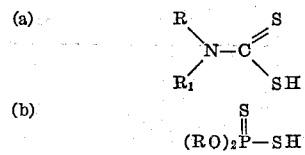

(b)

$$(RO)_2\overset{\overset{S}{\|}}{P}-SH$$

the metal in said salts being selected from the class consisting of the metals of Groups IA, IIA, IIB, IVA, VA and VIII of the Periodic Table, and the amine in said salts being selected from the class consisting of primary, secondary and tertiary amines substituted with hydrocarbon radicals of from one to about 20 carbon atoms wherein R and $R_1$ may be the same or different and are hydrocarbon radicals having from 1 to about 30 carbon atoms selected from the group consisting of alkyl, cycloalkyl, aryl, alkaryl, and aralkyl radicals.

2. The composition of claim 1 wherein said tungsten compound has the formula $$W(OR)_6$$

wherein R is an aryl radical selected from the group consisting of phenyl and naphthyl radicals and these radicals substituted with other hydrocarbon substituents so that said aryl radical contains from 6 to about 18 carbon atoms, and said sulfur-containing compound has the formula $$M-[S-\overset{\overset{S}{\|}}{P}-(OR)_2]_2$$

wherein M is a bivalent metal selected from the group consisting of cadmium, calcium, barium, nickel, and zinc, and R is an alkyl group having from about 1 to 12 carbon atoms.

3. The composition of claim 2 wherein said tungsten compound is hexanaphthyloxy tungsten and said sulfur-containing compound is a zinc dialkyl phosphorodithioate.

4. The composition of claim 2 wherein said tungsten compound is dichlorotetranaphthyloxy tungsten and said sulfur-containing compound is dibutyl disulfide.

References Cited by the Examiner

UNITED STATES PATENTS

| | | | |
|---|---|---|---|
| 2,609,342 | 9/1952 | White et al. | 252—25 |
| 3,047,500 | 7/1962 | Matson | 252—46.4 |

FOREIGN PATENTS

| | | |
|---|---|---|
| 844,811 | 8/1960 | Great Britain. |
| 865,970 | 4/1961 | Great Britain. |

DANIEL E. WYMAN, *Primary Examiner.*